United States Patent [19]

Jensen et al.

[11] Patent Number: 4,729,491

[45] Date of Patent: Mar. 8, 1988

[54] VENT PLUG

[75] Inventors: Niels D. Jensen, Bjerringbro; Biarne Dissing, Hammel, both of Denmark

[73] Assignee: Grundfos International A/S, Denmark

[21] Appl. No.: 48,053

[22] Filed: May 11, 1987

[30] Foreign Application Priority Data

May 12, 1986 [DK] Denmark .............................. 2193/86

[51] Int. Cl.⁴ ............................................ B65D 41/04
[52] U.S. Cl. ...................................... 220/288; 220/374
[58] Field of Search ......................... 220/288, 373, 374

[56] References Cited

U.S. PATENT DOCUMENTS

| 3,422,982 | 1/1969 | Terwoerds et al. | 220/374 |
| 4,337,875 | 7/1982 | Lyons | 220/374 |
| 4,512,499 | 4/1985 | Uuskallio | 220/374 |
| 4,524,881 | 6/1985 | Mierzwa | 220/374 |

Primary Examiner—George T. Hall
Attorney, Agent, or Firm—M. N. Meller

[57] ABSTRACT

A plug, such as a vent plug for mounting in a hole in the wall of a machine element, e.g. the end wall of the rotor casing of a pump comprising a canned motor, comprising an outer cup provided with a support flange and an inner cup pressed into the outer cup and comprising a locking device. The locking device is preferably formed as a locking flange, e.g. in the form of part of a thread serving to interlock the plug and the wall. The distance between the locking device and a sealing face of the support flange or of a sealing element connected to the support flange is smaller than the axial displacement of the plug in connection with the engagement of the locking device with the wall.

9 Claims, 6 Drawing Figures

VENT PLUG

FIELD OF THE INVENTION

The invention relates to a plug, such as a vent plug for mounting in a hole in the wall of a machine element, e.g. the end wall of the rotor casing of a pump comprising a canned motor.

DESCRIPTION OF THE PRIOR ART

Known plugs of the above kind are normally made by cutting of a solid rod material. These known plugs do not meet with the requirements nowadays made on rational manufacturing since they require many machining operations and the waste of material is large resulting in comparatively expensive plugs.

SUMMARY OF THE INVENTION

The object of the invention is to provide a plug of the above stated kind which offers an effective sealing and which is simple and rational to manufacture.

The plug according to the invention is characterised by comprising an outer cup provided with a support flange and an inner cup pressed into this outer cup and having a locking device, preferably formed as a locking flange for interlocking the plug and the wall, the distance between the locking device and the sealing face of the support flange or of a sealing element connected to the support flange being smaller than the axial displacement of the plug in connection with the engagement of the locking device with the wall. In this way the plug becomes particularly inexpensive and easy to manufacture as it can be made without using cutting processes.

According to the invention the support flange can be formed as part of a thread whose inner thread end is closer to the sealing face of the support flange than the axial displacement of the plug resulting from screwing in along the entire thread portion. In this way the sealing face of the support flange is effectively pressed against the wall which the plug has to seal.

Furthermore according to the invention, the locking flange comprises a number of thread segments belonging to a multiple thread. In this way the pressure of contact between the sealing face of the support flange and the wall against which the plug has to seal is more evenly distributed.

Additionally according to the invention, the sealing element can be an O-ring or a gasket. This embodiment has in practice turned out to be particularly advantageous as a particularly effective sealing is obtained.

Furthermore according to the invention, the support flange can pass into a rim portion extending preferably in a direction towards the thread flange. This embodiment is particularly advantageous in connection with fitting a sealing element, e.g. an O-ring, between the support flange and the auxiliary flange since the rim portion prevents the sealing element from being pressed outwards and thus ensures the desired sealing.

Furthermore according to the invention, the outer surface of the outer cup can comprise means of engagement. This makes it easier to fit or remove the plug.

Furthermore according to the invention, the means of engagement can be an oblong hole or groove formed in the end surface of the outer cup. In this way the cup can be screwed in and off by means of a screw driver, a coin or similar flat object.

Furthermore according to the invention, the means of engagement can be two or more surfaces formed on and extending in pairs parallel with the axis of the outer cup. In this way the cup can be screwed in and off by means of an adjustable spanner, a socket spanner or a similar tool.

Finally according to the invention, at least one of the cups, preferably both the inner and the outer cup, can be made of corrosion resistant sheet metal, such as a stainless steel sheet having a thickness of between 0.2 and 3 mm, preferably between 0.5 and 2 mm. These sheet thicknesses have in practice turned out to be adequate to give the cup the necessary strength and by using corrosion resistant sheet, the cup becomes applicable for many purposes.

BRIEF DESCRIPTION OF THE DRAWING

The invention is more closely explained in the following with reference to the accompanying drawing, in which.

DESCRIPTION OF THE PREFERRED EMBODIMENTS

Figure 2:
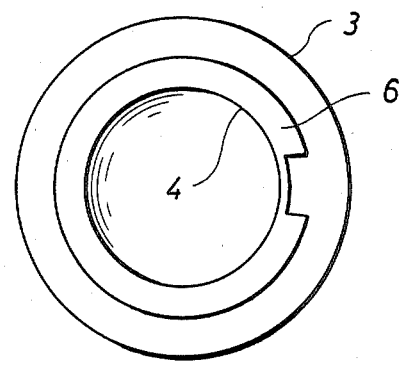
FIG. 2 is a bottom view of the plug of FIG. 1.
Figure 3:
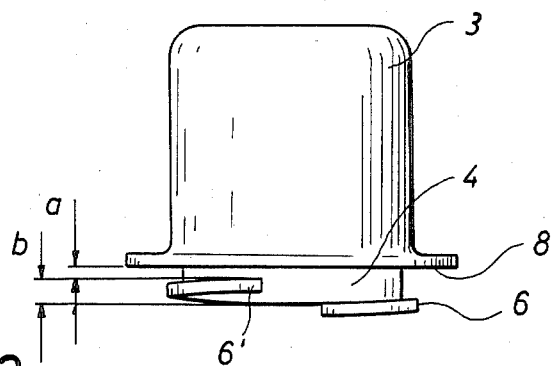
FIG. 3 is a side view of the plug of FIG. 1.

The plug 1 according to the invention serves to close a hole in the wall 2 of a machine element, comprising an outer cup 3 and an inner cup 4 pressed into the outer cup 3. The outer cup 3 comprises a support flange 5, whereas the inner cup 4 comprises a locking device 6, preferably formed as a locking flange and serving to interlock the plug and the wall 2. The distance a between the locking device 6 and a sealing face 8 of the support flange 5 is smaller than the axial displacement b of the plug 1 in connection with the engagement of the locking device 6 with the wall 2. In the embodiments shown in FIGS. 1–3, the locking device is provided by forming the locking flange as part of a thread 6 whose end 6' situated closest to the support flange 5 is closer to the sealing face 8 of the support flange 5 (distance a) than the axial displacement of the plug 1 resulting from screwing in along the entire thread portion 6 (distance b).

Figure 1:
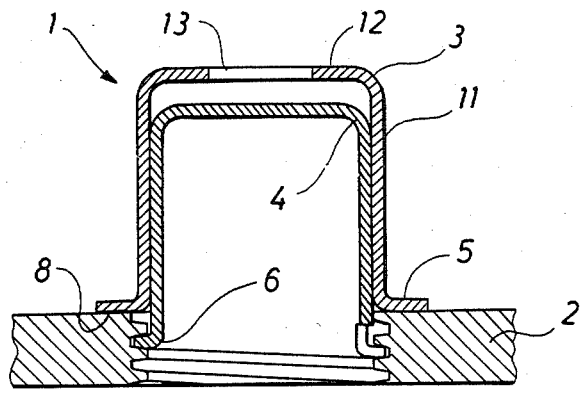
FIG. 1 is a sectional view of an inventive plug screwed into a wall.

As appears from FIG. 1, the outer surface 11 of the outer cup 3, more specifically the end surface 12, comprises means of engagement in the form of an oblong hole or groove 13. By inserting a screw driver or a coin into said groove 13, the cup can be screwed in or off the wall 2.

Figure 4:
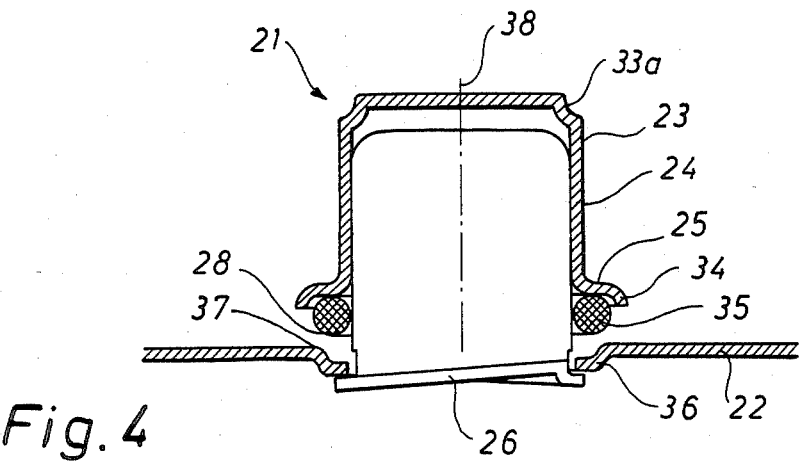
FIG. 4 is another embodiment of the plug according to the invention mounted in a wall of sheet material.
Figure 5:
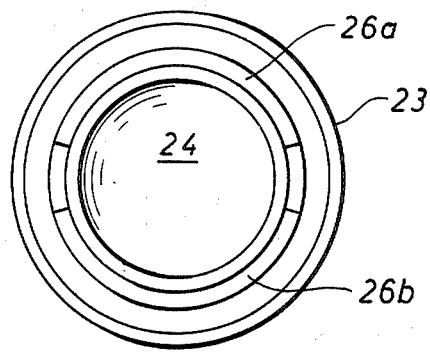
FIG. 5 is a bottom view of the plug of FIG. 4, as the sealing element belonging to the plug has been omitted.
Figure 6:
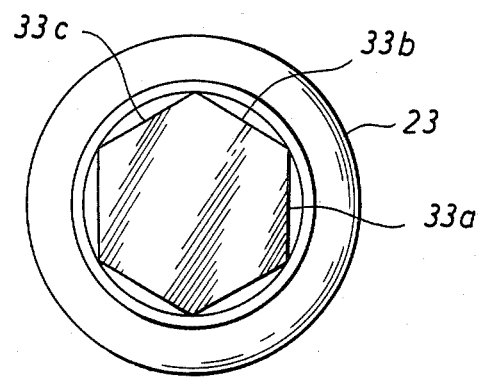
FIG. 6 is a top view of the plug of FIG. 4.

FIGS. 4, 5, and 6 show another embodiment of the plug 21 according to the invention and comprising an outer cup 23 and an inner cup 24 pressed into the outer cup 23. The inner cup 24 comprises a locking flange 26 comprising a number of thread segments 26a, 26b belonging to a multiple thread. The outer cup 23 comprises a support flange 25 passing into a rim portion 34 extending preferably in a direction towards the thread flange 29.

A sealing element in the form of an O-ring 35 having a sealing surface 28 is placed between the support flange 25 and the thread flange 29.

FIG. 4 shows the plug 21 immediately before said plug engages a thread 36 corresponding to the thread segments 26a, 26b in a wall 22 made of sheet material. In order to illustrate that reference is made to a multiple thread, there is no sectional view of the inner cup. The advantage of using a multiple thread is that the plug has to be turned less in order to bring the sealing surface 28 into contact with an appropriate surface 37 on the wall 22 and that a more even distribution of the pressure of contact between the sealing surfaces 28, 37 is achieved.

As suggested in FIGS. 4 and 6 means of engagement in the form of six surfaces 33a, 33b, 33c are formed on the outer surface of the outer cup 23 and extending in pairs parallel with the axis 38 of the plug 21 and thus of the cup 23.

Both the outer cup 3, 23 and the inner cup 4, 24 are comparatively easy to manufacture by deep-drawing of a sheet material, preferably a metal sheet and particularly a corrosion resistant metal sheet, e.g. a stainless steel sheet having a thickness of between 0.2 and 3 mm, preferably between 0.5 and 2 mm. In connection with certain applications it may, however, be advantageous to manufcture the two cups 3, 23; 4, 24 of different materials. As an example, the outer cup 3 of the embodiment of FIG. 1 can be made of plastic whereas the inner cup 4 is made of metal. Hereby the support flange 5 on which the sealing surface is situated in said embodiment seals additionally towards the wall 2 provided an appropriate plastic material is selected.

The invention can be modified in many ways without thereby departing from its idea.

We claim:

1. A plug, such as a vent plug for mounting in a hole in the wall (2, 22) of a machine element, e.g. the end wall of the rotor casing of a pump comprising a canned motor, wherein it comprises an outer cup (3, 23) provided with a support flange (5, 25) and an inner cup (4, 24) pressed into this outer cup (3, 23) and having a locking device (6, 26), preferably formed as a locking flange for interlocking the plug (1, 21) and the wall (2, 22), the distance (a) between the locking device (6, 26) and a sealing face (8, 28) of the support flange (5, 25) or of a sealing element connected to the support flange (5, 25) being smaller than the axial displacement of the plug (1, 21) in connection with the engagement of the locking device with the wall (2, 22).

2. A plug as claimed in claim 1, wherein the locking flange is formed as part of a thread (6) whose end (6') situated closest to the support flange (5) is closer to the sealing face (8) of the support flange (5) than the axial displacement (b) of the plug (1) resulting from screwing in along the entire thread portion (6).

3. A plug as claimed in claim 1, wherein the locking flange (26) comprises a number of thread segments (26a, 26b) belonging to a multiple thread.

4. A plug as claimed in claim 1, wherein the sealing element is an O-ring (35) or a gasket.

5. A plug as claimed in claim 1, wherein the support flange (25) passes into a rim portion (34) extending preferably in a direction towards the thread flange (29).

6. A plug as claimed in claim 1, wherein the plug comprises means of engagement on the outer surface (11, 31) of the outer cup (3, 23).

7. A plug as claimed in claim 6, wherein the means of the engagement are an oblong hole or groove (13) formed in the end surface (12) of the outer cup (3).

8. A plug as claimed in claim 6, wherein the means of engagement are two or more surfaces (37) formed on and extending in pairs parallel with the axis (38) of the outer cup (23).

9. A plug as claimed in claim 1, wherein at least one of the cups (3, 23; 4, 24), preferably both the inner (4, 24) and the outer cup (3, 23), is made of corrosion resistant sheet metal, such as a stainless steel sheet having a thickness of between 0.2 and 3 mm, preferably between 0.5 and 2 mm.

* * * * *

UNITED STATES PATENT AND TRADEMARK OFFICE
CERTIFICATE OF CORRECTION

PATENT NO. : 4,729,491
DATED : March 8, 1988
INVENTOR(S) : Niels D. JENSEN and Bjarne DISSING It is certified that error appears in the above-identified patent and that said Letters Patent are hereby corrected as shown below:

Page 1, left column, item [75], amend "Biarne" to read

--Bjarne--

Column 3, line 23, amend "manufcture" to read --manufacture--

Signed and Sealed this

Sixth Day of September, 1988

Attest:

DONALD J. QUIGG

*Attesting Officer*  *Commissioner of Patents and Trademarks*